(12) United States Patent
Evans

(10) Patent No.: US 8,152,892 B1
(45) Date of Patent: *Apr. 10, 2012

(54) LIQUID FERTILIZING COMPOSITIONS

(76) Inventor: Bryan Dale Evans, Olathe, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/965,529

(22) Filed: Dec. 10, 2010

Related U.S. Application Data

(63) Continuation-in-part of application No. 12/690,720, filed on Jan. 20, 2010, now Pat. No. 7,985,276, which is a continuation-in-part of application No. 12/060,644, filed on Apr. 1, 2008, now Pat. No. 7,674,312.

(60) Provisional application No. 60/971,635, filed on Sep. 12, 2007.

(51) Int. Cl.
*C05C 3/00* (2006.01)

(52) U.S. Cl. .................... 71/61; 71/63; 71/64.1

(58) Field of Classification Search ............... 71/61, 63, 71/64.1
See application file for complete search history.

(56) References Cited

U.S. PATENT DOCUMENTS

| | | | |
|---|---|---|---|
| 2,950,961 A | 8/1960 | Striplin, Jr. et al. | |
| 3,024,099 A | 3/1962 | Martinson | |
| 3,024,100 A | 3/1962 | Langguth et al. | |
| 3,104,969 A | 9/1963 | Miller et al. | |
| 4,219,348 A | 8/1980 | Parham, Jr. et al. | |
| 4,336,052 A | 6/1982 | Chen et al. | |
| 5,704,961 A | 1/1998 | Hudson | |
| 6,364,926 B1 | 4/2002 | Gryzik et al. | |
| 7,674,312 B2 * | 3/2010 | Evans | 71/61 |
| 7,985,276 B2 * | 7/2011 | Evans | 71/61 |
| 2004/0211234 A1 | 10/2004 | Volgas et al. | |
| 2009/0064747 A1 * | 3/2009 | Evans | 71/30 |

OTHER PUBLICATIONS

Select File History from related U.S. Appl. No. 12/060,644, dated Aug. 24, 2009 through Nov. 5, 2009, 24 pages.
Select File History from related U.S. Appl. No. 12/690,720, dated Jun. 18, 2010 through Feb. 3, 2011, 28 pages.

* cited by examiner

*Primary Examiner* — Wayne Langel
(74) *Attorney, Agent, or Firm* — Lathrop & Gage LLP

(57) ABSTRACT

Liquid fertilizer compositions and methods of making liquid fertilizer compositions are set forth herein. In one embodiment, a liquid fertilizing composition includes an aqueous ammonium chloride solution and an acrylamide copolymerized with acrylic acid. In another embodiment, a liquid fertilizing composition includes an aqueous ammonium chloride solution having a pH between 6.5 and 8.5 and an anionic polyacrylamide. The anionic polyacrylamide is present between 0.5 and 1.0 percent by weight. In yet another embodiment, a liquid fertilizing composition consists essentially of at least 16.5 percent by weight ammonium chloride, between 0.5 and 1.0 percent by weight acrylamide copolymerized with acrylic acid or salt thereof, an effective amount of corrosion inhibitor, and water.

17 Claims, No Drawings

LIQUID FERTILIZING COMPOSITIONS

RELATED APPLICATIONS

This application is a continuation-in-part of U.S. patent application Ser. No. 12/690,720, filed Jan. 20, 2010 now U.S. Pat. No. 7,985,276, which in turn claims the benefit of priority as a continuation-in-part of U.S. patent application Ser. No. 12/060,644, filed Apr. 1, 2008 and issued as U.S. Pat. No. 7,674,312, which in turn claims the benefit of priority to U.S. Provisional Patent Application No. 60/971,635, filed Sep. 12, 2007; the benefit of priority to each of these filings is accordingly claimed, and the contents of each of these filings are incorporated herein by reference.

BACKGROUND

Fertilizers are often provided to plants to promote healthy growth. Liquid fertilizer compositions and methods of making liquid fertilizer compositions are set forth herein.

SUMMARY

In one embodiment, a liquid fertilizing composition contains ammonium chloride and an anionic polyacrylamide. The anionic polyacrylamide preferably contains at least one monomeric unit of acrylamide and at least one monomeric unit of acrylic acid or salt thereof, and the anionic polyacrylamide is prepared by copolymerization of monomeric acrylamide and monomeric acrylic acid or salt thereof. By way of example, one such anionic polyacrylamide is KemGuard 5870 made by Kemira Chemicals, Inc. (Kennesaw, Ga., U.S.).

In another embodiment, a liquid fertilizing composition contains an aqueous ammonium chloride solution having a pH between 6.5 and 8.5 and an anionic polyacrylamide comprising at least one monomeric unit of acrylamide and at least one monomeric unit of acrylic acid or salt thereof. The anionic polyacrylamide is present between 0.5 and 1.0 percent by weight.

In yet another embodiment, a liquid fertilizing composition consists essentially of at least 16.5 percent by weight ammonium chloride, between 0.5 and 1.0 percent by weight anionic polyacrylamide, an effective amount of corrosion inhibitor, and water. The anionic polyacrylamide includes at least one monomeric unit of acrylamide and at least one monomeric unit of acrylic acid or salt thereof, and the anionic polyacrylamide is prepared by copolymerization of acrylamide and acrylic acid or salt thereof.

DETAILED DESCRIPTION

The application of compositions containing chloride ($Cl^-$) ions is known to benefit crops in a variety of ways. Among other things, the uptake of chloride ions by crops has been shown to increase crop yield, reduce susceptibility to disease, reduce disease damage, accelerate plant development, improve kernel weight, and reduce late-season lodging. Sources of chloride ion commonly used as fertilizers include potassium chloride, magnesium chloride, and calcium chloride, though each of these sources has disadvantages.

In searching for an alternative to these sources, aqueous ammonium chloride solutions having between 16.5 and 30 percent by weight of ammonium chloride, and preferably 24 to 25 percent by weight of ammonium chloride, have been tested as fertilizers. These ammonium chloride solutions experienced substantial problems with salting-out. "Salting-out" is used herein to indicate the formation of precipitate. However, after extensive testing, it was discovered that combining one or more dispersants selected from anionic polyacrylamides, having the general formula:

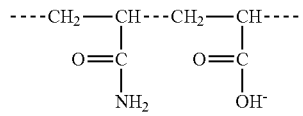

with the aqueous ammonium chloride solution reduced or eliminated salting-out. A product having CAS number 25987-30-8 and marketed as Cyanamer® P-70 by CYTEC Industries Inc. of West Paterson, N.J. is one such dispersant. This product is referred to herein as CAS 25987-30-8 or as "P-70.", and it should be understood that the chemical composition, and not the manufacturer or marketer, is of interest.

Other suitable anionic polyacrylamides have been found to include, for example: Cyanamer® P-94 by CYTEC Industries Inc. of West Paterson, N.J.; APS 600 Series and APS 700 Series marketed by Applied Polymer Systems of Woodstock, Ga.; Soilfix IR, Percol 710, Percol 790, DP10-0434, and Soilfix LDP marketed by Ciba Specialty Chemicals, Inc. of Suffolk, Va.; Sioloc-PAM marketed by Hercules Environmental, Inc. of Doraville, Ga.; HydroPAM marketed by Stockhausen, Inc. of Greensboro, N.C.; CFM 2000 PAM; Bluwat Anionic Polyacrylamide marketed by Yixing Bluwat Chemicals Co., Ltd. of China; and CAS 25085-02-3; as well as derivatives and combinations thereof.

Table 1 shows the temperature at which the ammonium chloride solution combined with various amounts of CAS 25987-30-8 salted-out. In Table 1, solid conditions are marked as such, and "X" represents any presence of precipitate in which the entire composition was not completely solid. The compositions in Table 1 included 24 to 25 percent by weight ammonium chloride, the indicated amount of CAS 25987-30-8, and water; the pH of the compositions in Table 1 was 6.0.

TABLE 1

| weight % CAS 25987-30-8 | 40° F. | 36° F. | 32° F. | 30° F. | 20° F. | 15° F. | 10° F. |
| --- | --- | --- | --- | --- | --- | --- | --- |
| 0.75 | | | | X | X | X | X |
| 0.50 | | X | X | X | X | X | X |
| 0.375 | | X | X | X | X | solid | solid |
| 0.19 | X | X | X | X | solid | solid | solid |
| 0 | X | X | X | solid | solid | solid | solid |

As shown in Table 1, adding 0.75 percent by weight of CAS 25987-30-8 to the ammonium chloride solution allowed the product to be used at temperatures as low as 32 degrees Fahrenheit. Ammonium chloride with 0.75 percent by weight P-70 has been used and sold by the present inventor with great success since 2004. Nevertheless, problems have arisen. Specifically, the product is corrosive and can destroy storage tanks.

To reduce the corrosivity of the composition, many corrosion inhibitors were tested, resulting in varying, but generally unsuitable, degrees of success. It was then determined that raising the pH of the ammonium chloride solution would alone reduce its corrosivity, and that adding a corrosion inhibitor in addition to raising the pH could also be beneficial. More particularly, raising the pH from approximately 6.0 to between 6.5 and 8.5, and preferably between 7.5 and 8.5, resulted in reduced corrosivity. Adding less than 0.1 percent by weight, and preferably approximately 0.05 percent by weight, of a corrosion inhibitor, such as NITROSolve™ 220, marketed by NALCO Company of Naperville, Ill., worked well in conjunction with raising the pH, as discussed above. NITROSolve™ 220 contains glycerol and a proprietary organic sulfonate. Effective amounts of other corrosion inhibitors (i.e., sufficient amounts to inhibit corrosion without significantly altering the fertilizing properties of the composition) may also be acceptable in conjunction with raising the pH as discussed above. Such corrosion inhibitors include, but are not limited to: products known as NITROSolve™ 330 and Protexo, both marketed by NALCO Company of Naperville, Ill.; P-35 by CYTEC Industries Inc. of West Paterson, N.J.; urea (46-0-0); corn steep liquor; as well as derivatives and combinations thereof.

Adding ammonia to the ammonium chloride solution is an effective way to raise the pH, although other methods would also be appropriate, including adding aqua ammonia and/or sodium hydroxide, for example. Adding ammonia may also increase the nitrogen (i.e., ammonia nitrogen) level of the fertilizer, from, for example, 5.5 percent to 6 percent. Even without adding ammonia to increase the pH, the ammonium chloride may provide a level of ammonia nitrogen, such as, for example, 5.5 percent by weight. Increased nitrogen levels have been shown to benefit crops.

Ammonium chloride may be obtained from waste sources, such as from spent batteries, or from the electronics industry where it is used to clean soldering irons, for example. Ammonium chloride obtained from waste sources will vary in pH depending upon the source, and will most likely contain impurities. Low levels of impurities may be insignificant to the present aqueous fertilizer compositions so long as the impurities are not present in a concentration that is unsafe for use in fertilizer. Alternatively, ammonium chloride with a standardized purity rating may be obtained directly from a chemical supplier.

The aqueous ammonium chloride fertilizer with increased pH and, optionally, one or more corrosion inhibitors is much less corrosive than an aqueous ammonium chloride fertilizer having a pH at or below 6. The composition having increased pH may thus allow the fertilizer to be safely stored in steel tanks and increase the useful life of applicators (i.e., sprayers).

As set forth in U.S. Pat. No. 7,674,312, raising the pH of the ammonium chloride solution was also found to have an unexpected synergic effect on the fertilizer's salt-out properties. Table 2 shows the temperature at which the ammonium chloride solution combined with various amounts of CAS 25987-30-8 salted-out when the pH of the ammonium chloride solution was raised from approximately 6.0 (Table 1) to approximately 7.8. In Table 2, solid conditions are marked as such, and "X" represents any presence of precipitate in which the entire composition is not completely solid. The compositions in Table 2 included 24 to 25 percent by weight ammonium chloride, the indicated amount of CAS 25987-30-8, and water; the pH of the compositions in Table 2 was 7.8. A corrosion inhibitor was not present in the compositions of Table 1 or the compositions of Table 2.

TABLE 2

| weight % CAS 25987-30-8 | 40° F. | 36° F. | 32° F. | 30° F. | 20° F. | 15° F. | 10° F. |
|---|---|---|---|---|---|---|---|
| 0.75 | | | | | | | X |
| 0.50 | | | | | X | X | X |
| 0.375 | | | | | X | X | X |
| 0.19 | | | | X | X | X | solid |
| 0 | | X | X | X | X | solid | solid |

As shown in Table 2, adding 0.75 percent by weight of CAS 25987-30-8 to an ammonium chloride solution with a pH of approximately 7.8 unexpectedly allowed the product to be used at temperatures above about 10 degrees Fahrenheit.

Because of the substantially lowered salt-out temperature, the aqueous ammonium chloride fertilizer could be applied from the fall through the early spring, which are times when the prior aqueous ammonium chloride fertilizer with a pH of approximately 6.0 could not have been effectively applied. Applying the fertilizer in the fall through early spring may increase yield between 7 and 12 bushels per acre, substantially increasing revenue per acre. Similarly, the surprisingly low salt-out temperature may allow the aqueous ammonium chloride fertilizer to be applied in areas of colder climate with beneficial results.

It is also disclosed herein that, by altering the composition of acrylamide and acrylate in the anionic polyacrylamide, a substantially lowered salt-out temperature can be achieved without raising the pH of the aqueous ammonium chloride fertilizer. More particularly, commercial anionic polyacrylamide (e.g., CAS 25987-30-8 marketed as Cyanamer® P-70) is typically made by hydrolyzing a polymerized acrylamide with peroxide to obtain the acrylate functionality. If, instead, the anionic polyacrylamide (which can still have a CAS number 25987-30-8, for example) is made by copolymerizing acrylamide with acrylic acid or salt thereof, then a more controlled acrylamide/acrylate pattern may result. Such an anionic polyacrylamide is marketed as KemGuard 5870 and Colloid 237 with a CAS number 25987-30-8 by Kemira Chemicals, Inc., which has an office in Kennesaw, Ga., and is referred to as "KemGuard 5870" in this disclosure. Combining KemGuard 5870 with an aqueous ammonium chloride solution has surprisingly reduced the salt-out temperature well beyond the salt-out temperature of the traditional combination of aqueous ammonium chloride solution and P-70. Moreover, while the traditional combination containing ammonium chloride and P-70 works best at a higher pH of between 6.5 and 8.5 (and preferably between 7.5 and 8.5), the new composition containing ammonium chloride and KemGuard 5870 works equally well across a broader spectrum of pH, for example, from pH 4 up to 8.5, if not higher. As such, the costs of raising the pH may be avoided by combining the aqueous ammonium chloride solution with the KemGuard 5870, and improved salt-out temperatures may nevertheless be obtained. The anionic polyacrylamide prepared by copolymerization of acrylamide and acrylic acid or salt thereof may, for example, have a concentration that is between 0.5 and 1.0 percent by weight of the composition, and the ammonium chloride may have a concentration of at least 16.5 percent by weight of the composition.

If desired, such as to reduce corrosivity, a corrosion inhibitor may be added to the aqueous ammonium chloride solution having the anionic polyacrylamide prepared by copolymerization of acrylamide and acrylic acid or salt thereof, and/or the pH of the solution may nevertheless be increased; these measures are not necessary to reduce the salt-out temperature of the liquid fertilizing composition, however.

Those skilled in the art appreciate that variations from the specified embodiments disclosed above are contemplated herein and that the described test results are not limiting. The description should not be restricted to the above embodiments or test results, but should be measured by the following claims.

What is claimed is:

1. A liquid fertilizing composition, comprising:
    ammonium chloride; and
    an anionic polyacrylamide comprising at least one monomeric unit of acrylamide and at least one monomeric unit of acrylic acid or salt thereof, wherein the anionic polyacrylamide is prepared by copolymerization of acrylamide and acrylic acid or salt thereof.

2. The composition of claim 1, further comprising a corrosion inhibitor.

3. The composition of claim 2, wherein the corrosion inhibitor includes at least one member selected from the group consisting of:
    (a) urea;
    (b) corn steep liquor;
    (c) glycerol; and
    (d) organic sulfonate.

4. The composition of claim 1, wherein the anionic polyacrylamide has CAS number 25987-30-8.

5. The composition of claim 1, wherein the anionic polyacrylamide has a concentration between 0.5 and 1.0 percent by weight of the composition.

6. The composition of claim 1, wherein the pH of the composition is between 4 and 8.5.

7. The composition of claim 1, wherein the pH of the composition is between 6 and 8.5.

8. A liquid fertilizing composition, comprising:
    an aqueous ammonium chloride solution having a pH between 6.5 and 8.5; and
    an anionic polyacrylamide comprising at least one monomeric unit of acrylamide and at least one monomeric unit of acrylic acid or salt thereof;
    wherein the anionic polyacrylamide is present in said composition between 0.5 and 1.0 percent by weight;
    wherein the anionic polyacrylamide is prepared by copolymerization of acrylamide and acrylic acid or salt thereof.

9. The composition of claim 8, further comprising an effective amount of a corrosion inhibitor.

10. The composition of claim 8, further comprising a corrosion inhibitor, and wherein:
    the corrosion inhibitor is present between 0.01 and 0.1 percent by weight; and
    the corrosion inhibitor includes at least one member selected from the group consisting of:
    (a) urea;
    (b) corn steep liquor;
    (c) glycerol; and
    (d) organic sulfonate.

11. The composition of claim 10, wherein the pH is between 6.5 and 7.5.

12. The composition of claim 8, wherein the anionic polyacrylamide has CAS number 25987-30-8.

13. A liquid fertilizing composition, consisting essentially of:

| Constituent | Weight % |
|---|---|
| ammonium chloride | at least 16.5 |
| anionic polyacrylamide | 0.5-1.0 |
| corrosion inhibitor | effective amount |
| water | balance | wherein the anionic polyacrylamide comprises at least one monomeric unit of acrylamide and at least one monomeric unit of acrylic acid or salt thereof, and wherein the anionic polyacrylamide is prepared by copolymerization of acrylamide and acrylic acid or salt thereof.

14. The composition of claim 13, wherein the corrosion inhibitor includes at least one member selected from the group consisting of:
    (a) urea;
    (b) corn steep liquor;
    (c) glycerol; and
    (d) organic sulfonate.

15. The composition of claim 13, wherein the pH is between 6 and 7.5.

16. The composition of claim 13, wherein the pH is between 4 and 8.5.

17. The composition of claim 13, wherein the anionic polyacrylamide has CAS number 25987-30-8.

* * * * *